United States Patent [19]
Holden

[11] Patent Number: 5,113,958
[45] Date of Patent: May 19, 1992

[54] SNOW TRAVEL VEHICLE

[76] Inventor: Thomas R. Holden, Rte. 1, Box 112, Le Center, Minn. 56057

[21] Appl. No.: 528,049

[22] Filed: May 23, 1990

[51] Int. Cl.⁵ .......................................... B62D 55/065
[52] U.S. Cl. ..................................... 180/9.4; 180/9.1; 280/442; 280/494
[58] Field of Search ......................... 180/9.1, 9.23, 9.4, 180/9.42, 9.46, 9.5; 280/442, 444, 488, 489, 494; 305/21

[56] References Cited

U.S. PATENT DOCUMENTS

| | | | |
|---|---|---|---|
| 2,933,143 | 4/1960 | Robinson et al. | 180/9.44 |
| 3,368,292 | 2/1968 | Prinoth | 180/9.4 |
| 3,484,843 | 12/1969 | Martin | 280/494 |
| 3,631,615 | 1/1972 | Reinsma | 180/9.1 |
| 3,946,822 | 3/1976 | Dohse et al. | 180/9.46 |
| 4,120,509 | 10/1978 | Reeve et al. | 280/442 |
| 4,154,456 | 5/1979 | Jensen et al. | 280/494 |
| 4,174,757 | 11/1979 | Stedman | 180/9.23 |
| 4,191,394 | 3/1980 | Kasselmann | 280/444 |
| 4,281,848 | 8/1981 | Youngers | 280/494 |
| 4,445,582 | 5/1984 | Andersson | 180/9.1 |
| 4,836,318 | 6/1989 | Tonsor et al. | 305/21 |

FOREIGN PATENT DOCUMENTS

| | | | |
|---|---|---|---|
| 0603364 | 7/1932 | Fed. Rep. of Germany | 280/444 |
| 1548665 | 7/1979 | United Kingdom | 180/9.1 |

Primary Examiner—Charles A. Marmor
Assistant Examiner—A. M. Boehler
Attorney, Agent, or Firm—Burd, Bartz & Gutenkauf

[57] ABSTRACT

A snow travel vehicle for movement through deep snow which is characterized by a two-part articulated chassis, independent beam suspension for tracks on opposite sides of each of the chassis parts and a hydraulic drive system for the vehicle. The two parts of the articulated chassis are pivotally connected about a vertical axis for limited relative movement for steering and about a horizontal axis for limited relative movement to accommodate ground irregularities. Each track includes a longitudinal "walking" beam pivotally connected at the end of a transverse crossbeam. A cleated tread is tautly supported by a plurality of in-line wheels, one of those wheels being a drive sprocket supported by the "walking" beam. A direct drive hydraulic motor is connected to the drive sprocket. A hydraulic power system is provided connected to each of the hydraulic motors and an internal combustion power system is provided to energize the hydraulic power system.

16 Claims, 7 Drawing Sheets

SNOW TRAVEL VEHICLE

BACKGROUND THE INVENTION

1. Field of the Invention

This invention is directed to a new and improved snow travel tractor-type vehicle. Such vehicles are used for a number of utilitarian purposes in northern climes where deep snow or lack of roads makes ordinary travel difficult or impossible, such as hauling feed to livestock in the fields, patrolling power lines, and the like. One primary use is the towing of snowmobile and cross-country ski trail grooming equipment.

The snow travel vehicle of the present invention is characterized by a two-part articulated chassis, "walking beam" snow tracks and hydraulic drive.

2. Summary of the Invention

Broadly stated, the snow travel vehicle, according to the present invention, comprises a two-part articulated chassis having at least one track on each opposite side of each of the chassis parts. Each of the tracks is independently suspended and includes a continuous cleated articulated tread supported by a plurality of longitudinally in-line wheels. One of those wheels is a drive sprocket having a direct drive hydraulic motor connected to it. The tracks are pivotally connected to the opposite ends of crossbeams carried by each chassis part. The chassis is pivoted about a vertical axis for limited side-to-side relative movement for steering, and pivoted about a horizontal axis for limited movement to accommodate ground irregularities. Steering is accomplished by hydraulic cylinders. A hydraulic power system is provided connected to each of the hydraulic motors and cylinders. An internal combustion power system is mounted on one part of the chassis to energize the hydraulic power system.

BRIEF DESCRIPTION OF THE DRAWINGS

The invention is illustrated by the accompanying drawings in which corresponding parts are identified by the same numerals and in which.

DETAILED DESCRIPTION OF THE PREFERRED EMBODIMENT

Figure 1:
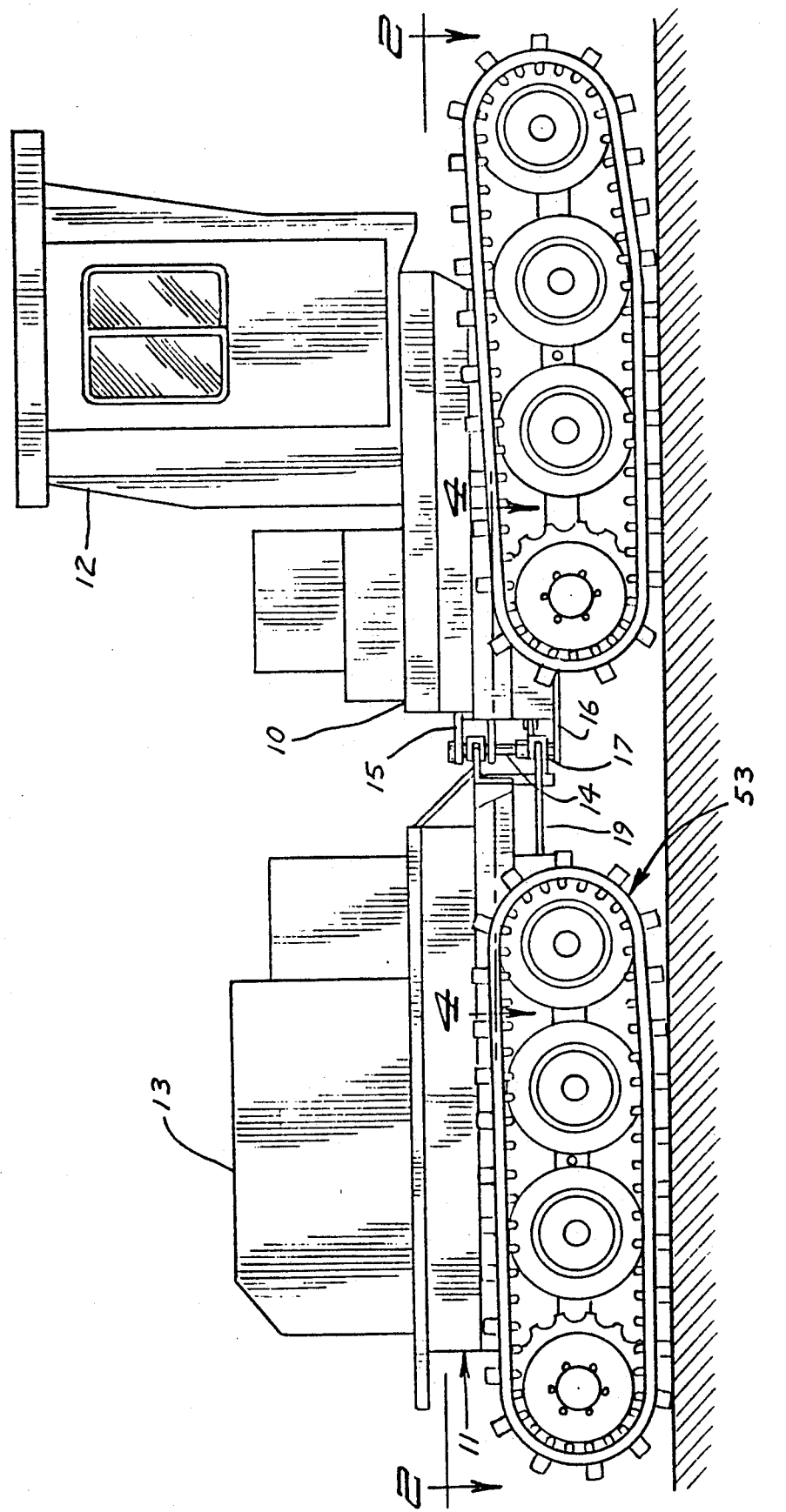
FIG. 1 is a right side elevation of the snow travel vehicle according to the present invention.
Figure 2:
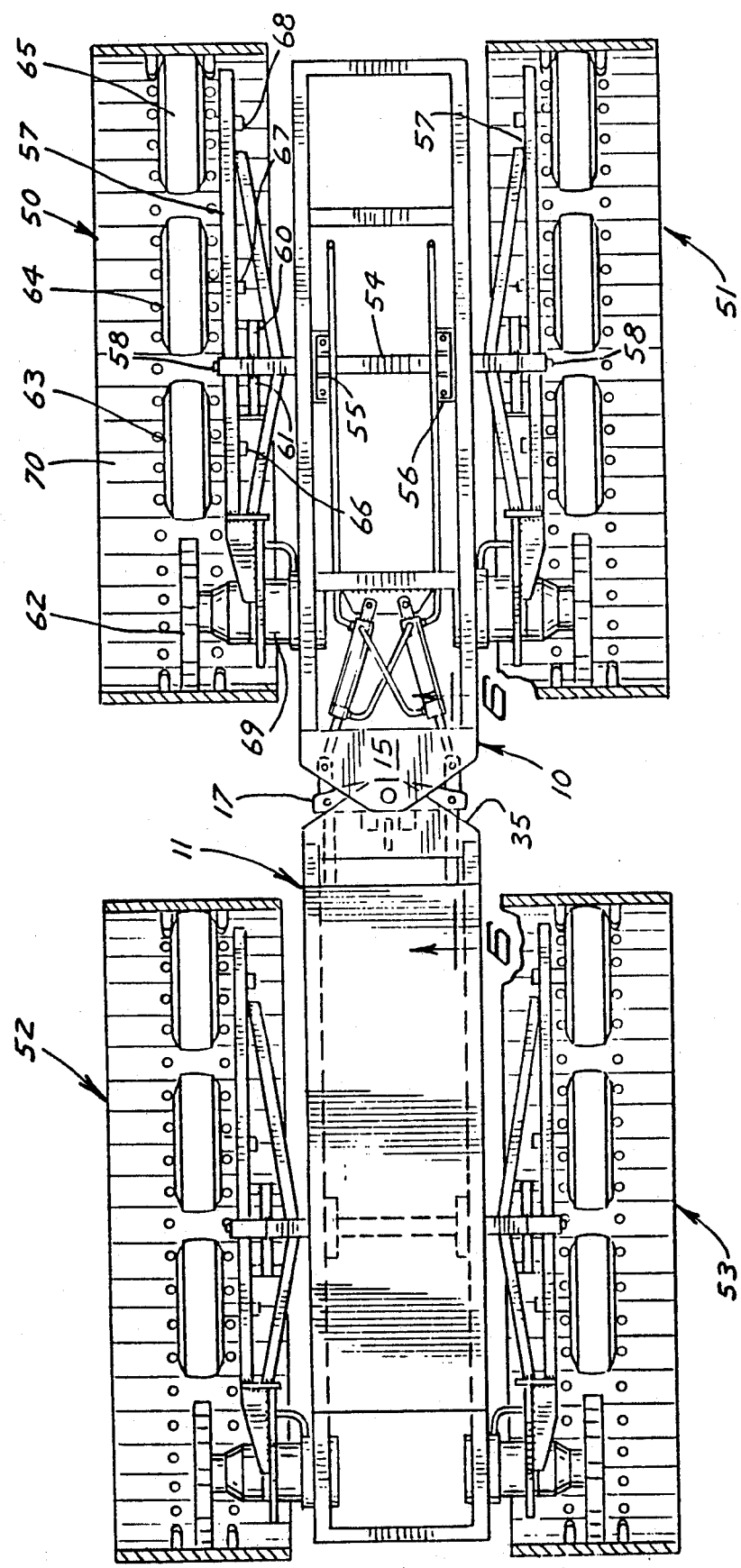
FIG. 2 is a sectional plan view on the line 2—2 of FIG. 1, and in the direction of the arrows, shown with a portion of the track tread removed to reveal hidden structure.

Referring now to the drawings, and particularly to FIG. 1, there is shown a tractor-like snow travel vehicle according to the present invention comprising a two-part articulated chassis including a forward part 10, and a rearward part 11. An operator's cab 12 is mounted on the forward chassis part 10, a power plant 13 is mounted on the rear chassis part 11. The power plant comprises an internal combustion engine fueled with gasoline, diesel oil, or the like, and connected to a hydraulic power system of conventional design comprising a fluid reservoir pump and hoses, as is well known in the art. The primary function of the internal combustion engine is to power the hydraulic system, which in turn drives the snow travel vehicle.

The parts 10 and 11 of the articulated chassis are connected in a pivotal joint which permits both limited side-to-side movement between the chassis parts to provide for steering and limited relative movement about a horizontal axis to accommodate variations in the ground surface on which the vehicle is traveling. A vertical pivot pin 14 is supported between parallel spaced apart transverse horizontal plates 15 and 16 at the rearward end of forward chassis part 10 and comprising part of the frame thereof. Pivot pin 14 is engaged by transverse horizontal crossbar 17 forming part of rear chassis part 11 and connected thereto by longitudinally extending parallel horizontal tie rods 18 and 19. The ends of the tie rods 18 and 19 are connected in crossbar 17 and the frame of rear chassis part 11 in ball joints permitting limited relative rotation about both vertical and horizontal axes.

Figure 4:
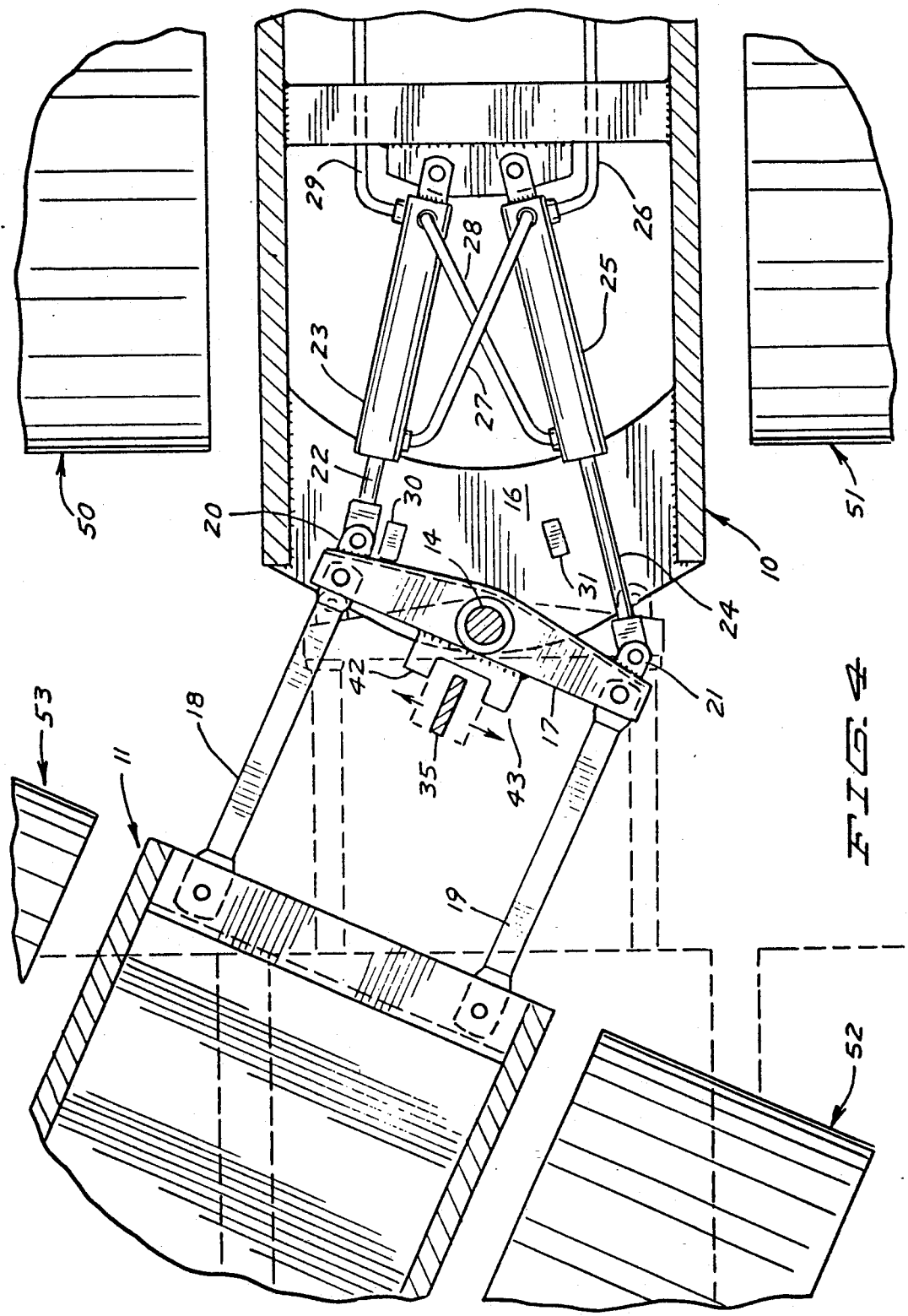
FIG. 4 is a horizontal section on a further enlarged scale on the line 4—4 of FIG. 1.

Crossbar 17 has forwardly projecting ears 20 and 21 at its opposite ends. The free end of piston rod 22 of hydraulic cylinder 23 is pivotally connected to crossbar 17 through ear 20. The free end of piston rod 24 of hydraulic cylinder 25 is similarly pivotally connected to the opposite end of crossbar 17 through ear 21. Hydraulic cylinders 23 and 25 extend generally longitudinally and, in turn, are pivotally connected to the frame of forward chassis part 10. As seen in FIG. 4, for example, steering in one direction is accomplished by introducing hydraulic fluid under pressure through flow line 26 to one side of the piston in cylinder 25 to extend piston rod 24 so as to cause crossbar 17 to rotate on pivot pin 14. Simultaneously hydraulic fluid is introduced through flow line 27 to the opposite side of the corresponding piston in cylinder 23 to cause piston rod 22 to retract and assist in the rotation of crossbar 17. The fluid expelled from cylinder 25 is forced through flow line 28 to cylinder 23 and thence to flow line 29 for return to the hydraulic fluid reservoir along with the fluid expelled from cylinder 23. To steer in the opposite direction, the fluid flows are reversed.

The relative movement of crossbar 17 is transmitted to the rear chassis part 11 through tie rods 18 and 19 to cause relative movement between the chassis parts to steer the vehicle. The extent of rotation of crossbar 17 and the degree of steering turn are limited by stops 30 and 31 supported on and projecting upwardly from plate 16.

Figure 6:
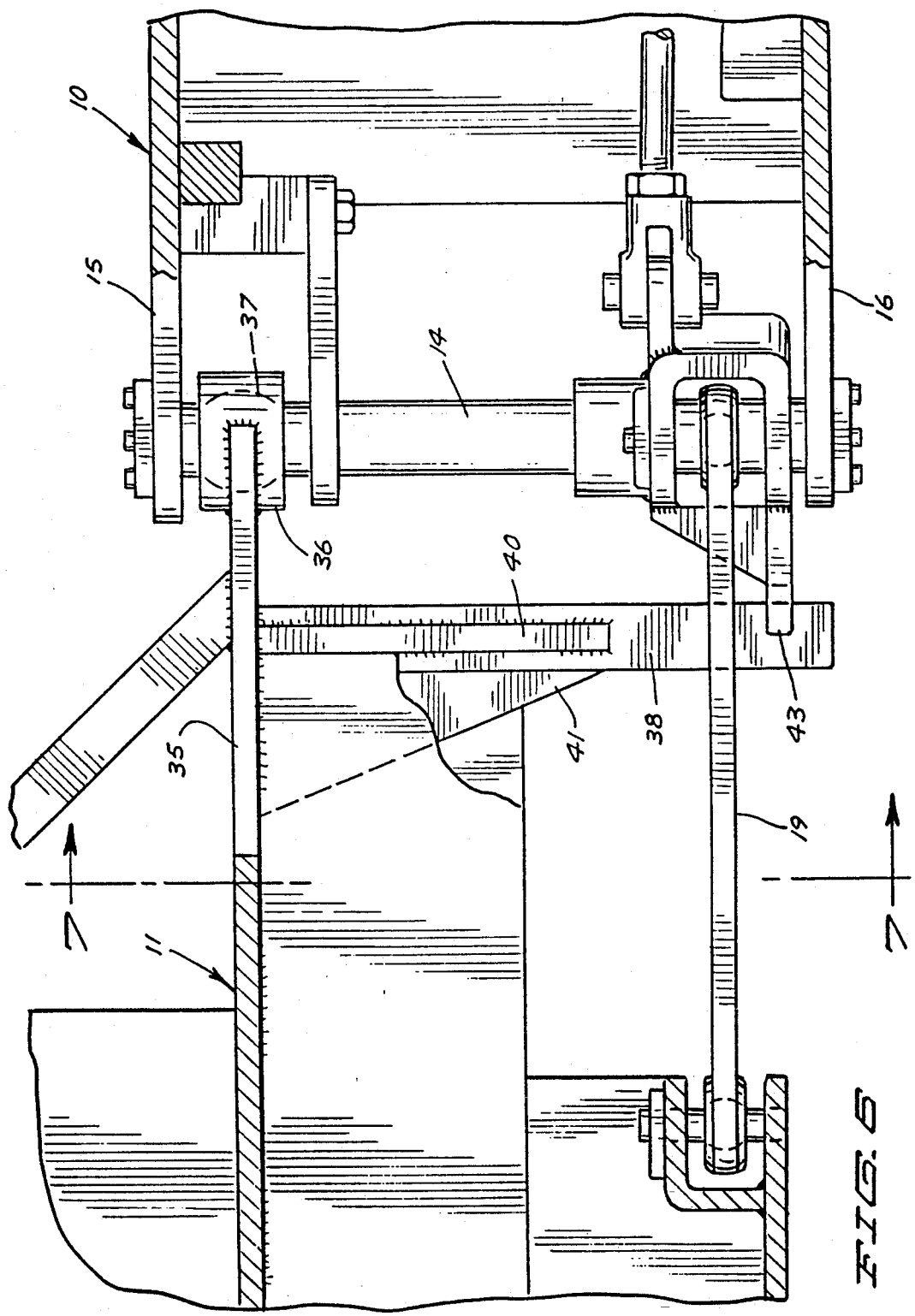
FIG. 6 is a fragmentary side elevation in section showing details of the pivotal connections between the articulated chassis parts.
Figure 7:
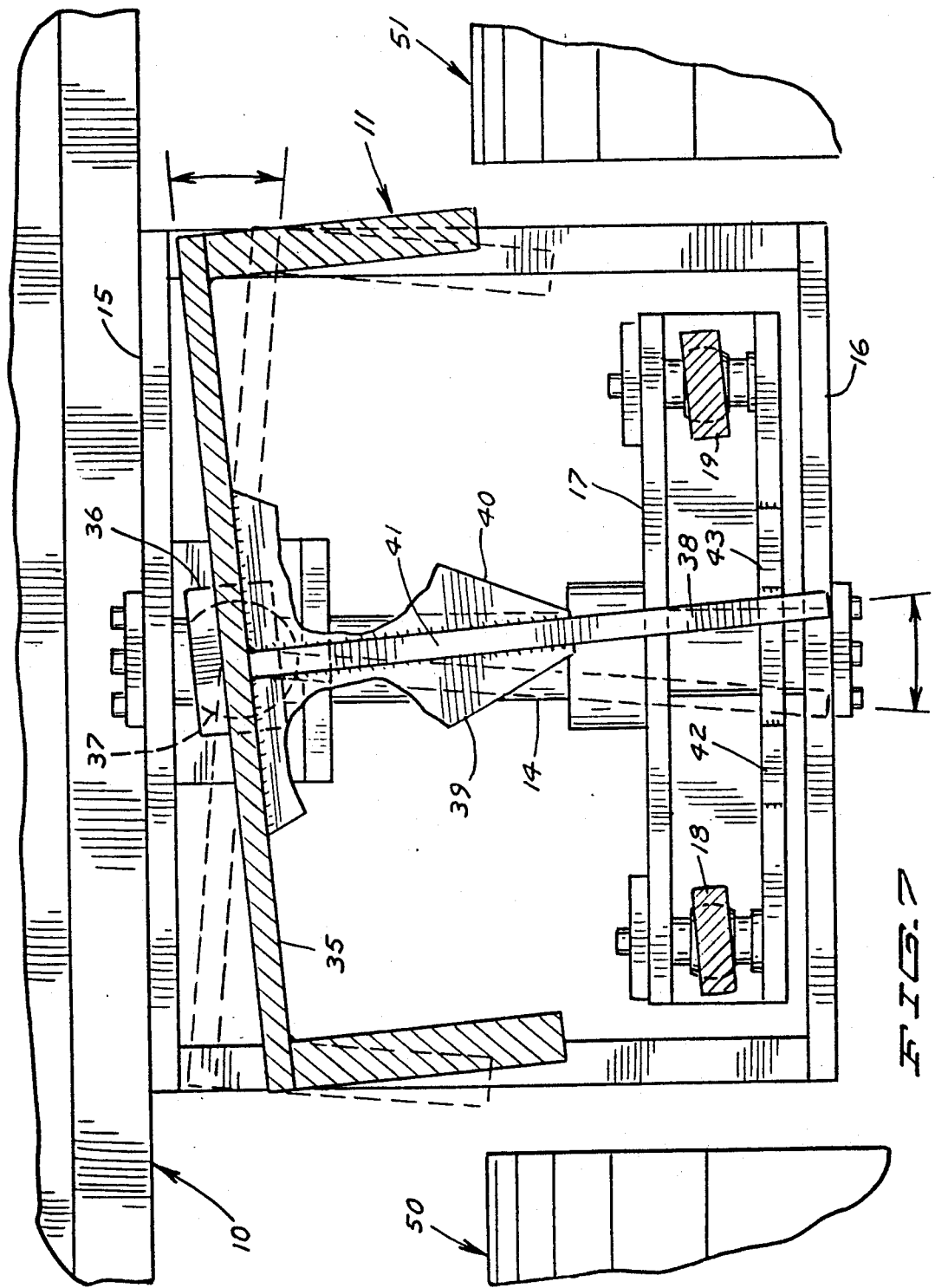
FIG. 7 is a transverse section on the line 7—7 of FIG. 6.

As best seen in FIGS. 6 and 7, the forward end of rear chassis part 11 includes a transverse horizontal plate 35 whose forward end supports a collar 36 whose inner surface is a socket bearing engaging ball 37 on pivot pin 14. The engagement of collar 36 and ball 37 in a ball and socket joint permits limited relative rotation about a horizontal axis between pivot pin 14 and plate 35, and thus between chassis parts 10 and 11. To limit this relative movement a bar 38 extends downwardly from plate 35. Bar 38 is braced and reinforced by gussets 39–41. The lowermost end of bar 35 is positioned for relative movement between stop ears 42 and 43 projecting rearwardly from crossbar 17 to limit the degree of relative movement between the chassis parts about a horizontal axis. This permits the vehicle to accommodate variations in the terrain over which it passes.

Figure 3:
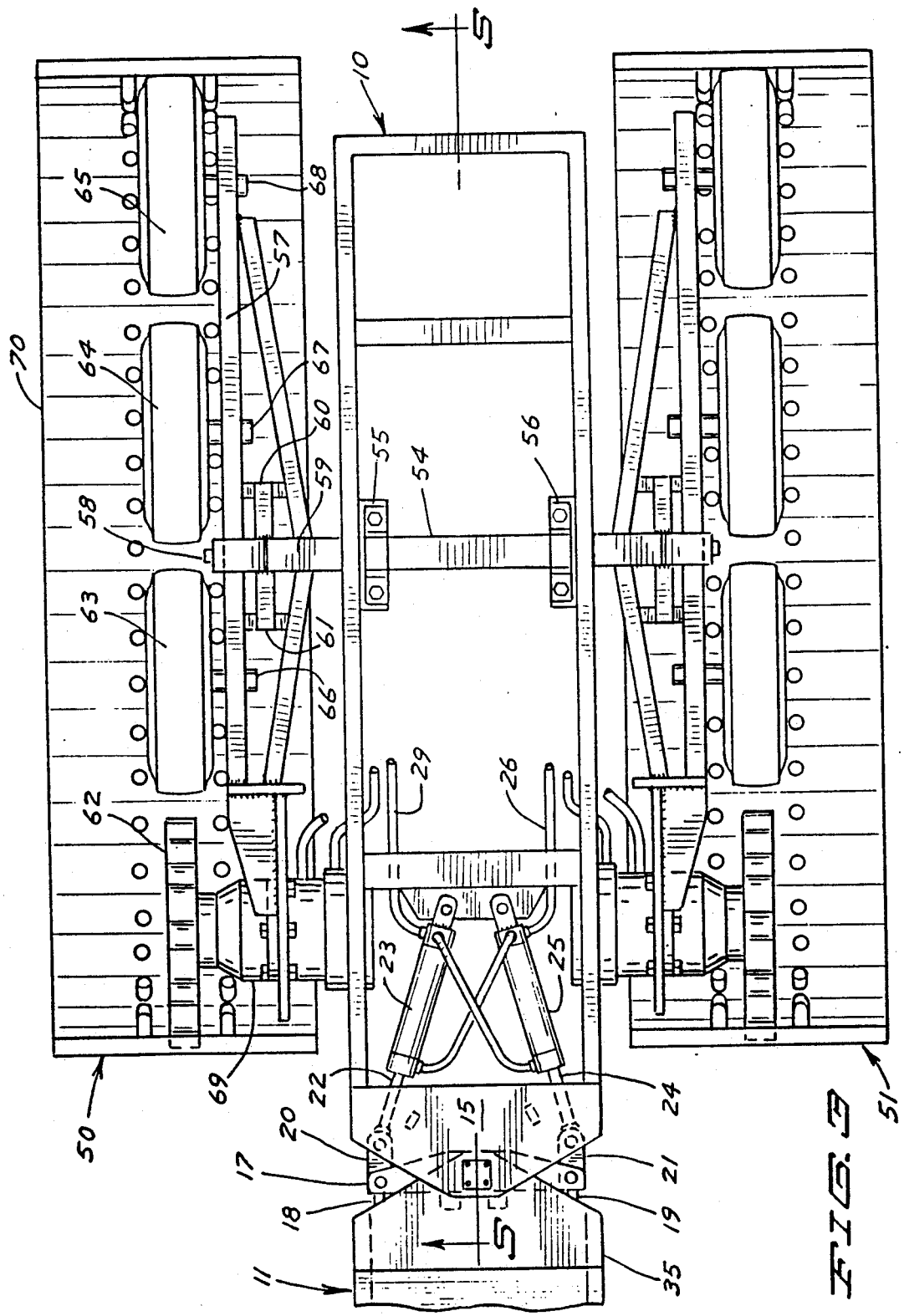
FIG. 3 is a similar plan view of the forwardmost chassis part on an enlarged scale.
Figure 5:
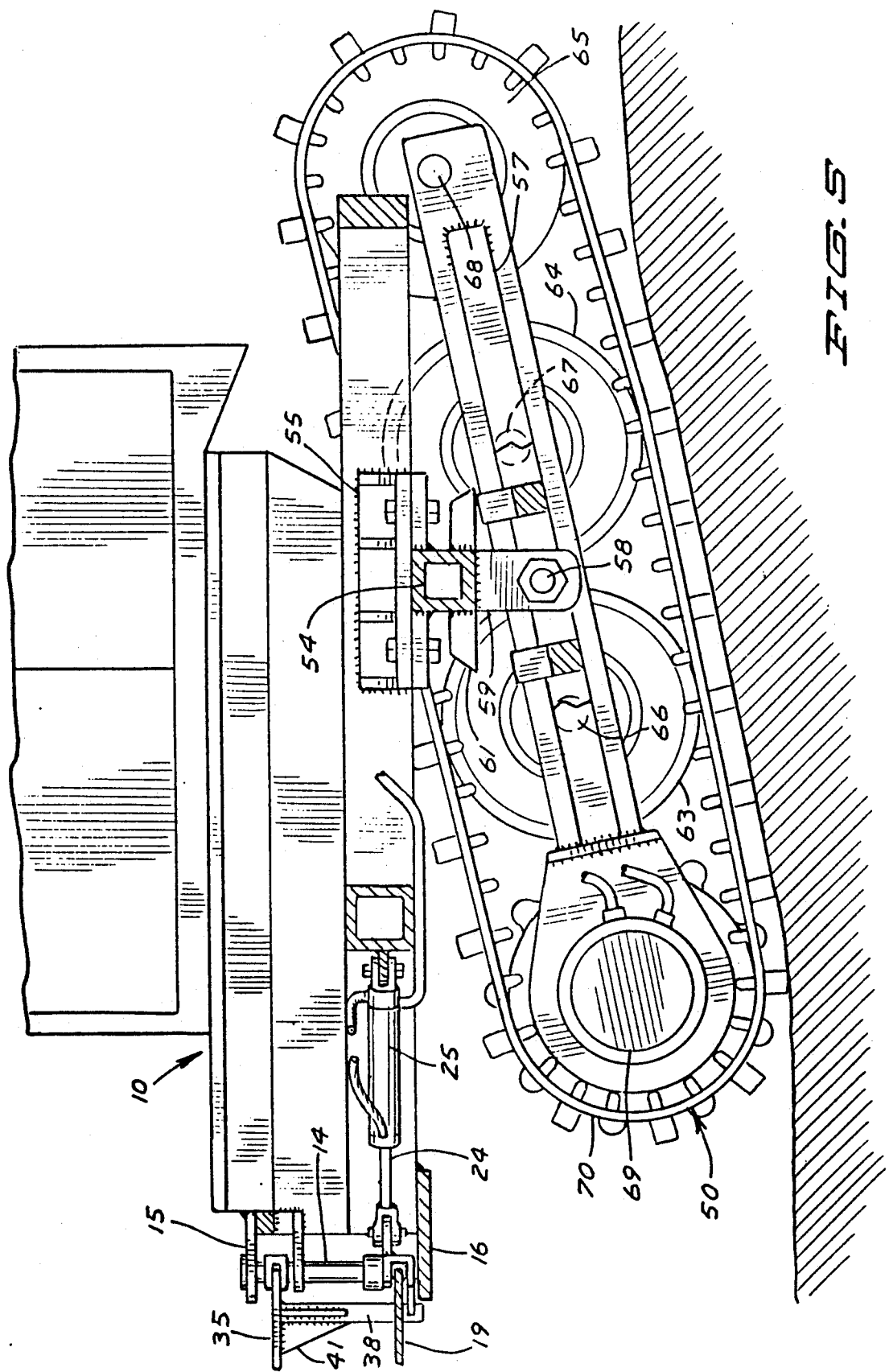
FIG. 5 is a right side elevation of the forward part of the chassis on an enlarged scale and showing the track in climbing position on a moderate ground rise.

The snow travel vehicle is supported and driven by a pair of tracks mounted on each chassis part. Thus, forward chassis part 10 is supported by tracks 50 and 51 and rear chassis part 11 is supported by tracks 52 and 53. The tracks are of similar construction. Tracks 50 and 51 and tracks 52 and 53 are mirror images of one another. Track 50 will be described in detail as representative, as best seen in FIGS. 3 and 5.

Tracks 50 and 51 are supported at the ends of a crossbeam 54 which extend beyond the side edges of the frame of forward chassis part 10. Crossbeam 54 is fixed to the chassis frame by brackets 55 and 56 welded or otherwise fixedly secured to the chassis frame.

A longitudinally extending "walking" beam 57 is pivotally supported at 58 in a bracket 59 extending downwardly adjacent the end of crossbeam 54. In this manner each of the tracks is independently suspended for movement in response to irregularities and other variations in ground level. Rotational movement of longitudinal beams 57 about the horizontal axes of pivots 58 is restricted by stop means 60 and 61 projecting longitudinally from brackets 59.

Longitudinal beam 57 supports a plurality of in-line wheels journaled for rotation about parallel transverse horizontal axes. These wheels include a drive sprocket 62 and idlers 63-65. The idlers are desirably in the form of rubber-tired vehicle wheels journaled for rotation on stub axles 66-68, respectively. Sprockets 62 are driven by direct drive, coaxially aligned hydraulic motors 69. One exemplary form of hydraulic motor which may be used is the "S" series wheel motor sold by Poclain Hydraulics of Ververie, France. Others include the TORQUE-HUB (R) wheel drive motor sold by Fairfield Manufacturing Company, Inc. of Lafayette, Ind., driven by series 90 hydraulic wheel motors sold by Sundstrand-Sauer of Ames, Iowa.

An endless articulated cleated tread 70 of conventional structure extends tautly around the drive sprocket and idlers. The inner surface of the tread has spaced apart transverse crossbars which engage the drive sprocket and spaced apart parallel inwardly extending fingers which engage the side surfaces of the idlers to maintain the tread in alignment, in the conventional manner.

The snow travel vehicle is driven wholly by the hydraulic motors 69. The principal function of the internal combustion power plant 13 is to operate the hydraulic system by maintaining pressure of the hydraulic fluid. Conventional controls are used to regulate the flow of hydraulic fluid to the motor 69 to regulate the speed of the vehicle. Similarly, conventional controls are used for steering, one exemplary form of such control being the Char-Lynn (R) 35 series steering control unit sold by Hydraulics Division of Eaton Corporation of Eden Prairie, Minn.

It is apparent that many modifications and variations of this invention as hereinbefore set forth may be made without departing from the spirit and scope thereof. The specific embodiments described are given by way of example only and the invention is limited only by the terms of the appended claims.

What I claim as my invention is:

1. A snow travel vehicle which comprises:
   A) a two-part in-line articulated chassis, one of said parts being a forward part and the other of said parts being a rearward part, each of said chassis parts including a frame, said chassis being pivoted about a vertical axis for limited side-to-side relative movement for steering and pivoted about a horizontal axis for limited movement to accommodate ground irregularities,
   1) one of said chassis parts including a transverse horizontal crossbar engaging a vertical pivot pin supported by the other of said chassis parts, said crossbar being pivotally connected to the frame of said chassis part by a spaced apart pair of parallel tie rods pivotally connected at their opposite ends to the crossbar and chassis frame, respectively,
   2) a pair of generally longitudinally extending hydraulic cylinders being pivotally secured at one end in the other of said chassis parts, said cylinders each including a piston having a free end extending beyond the end of the cylinder, and
   3) the free ends of the pistons of said cylinders pivotally connected to said crossbar on opposite sides of the pivot pin,
   B) at least one track on each opposite side of each of said chassis parts, each of said tracks being supported by a plurality of longitudinally in-line wheels, one of those wheels being a drive sprocket,
   C) a direct drive hydraulic motor connected to each of said drive sprockets,
   D) independent beam suspension means for each of said tracks,
   E) a hydraulic power system connected to each of said hydraulic motors, and to said cylinders, and
   F) an internal combustion power system mounted on one part of said chassis to energize said hydraulic power system.

2. A snow travel vehicle according to claim 1 wherein:
   A) said chassis part includes a transverse horizontal plate parallel to and spaced vertically from said crossbar,
   B) said vertical pivot pin includes a ball of a ball and socket bearing, and
   C) said transverse plate includes a centrally disposed socket bearing in engagement with said ball to permit relative movement between said chassis parts in response to variations in ground level.

3. A snow travel vehicle according to claim 2 wherein:
   A) said pivot pin and hydraulic cylinders are supported on the rearward end of the forwardmost of said chassis parts, and
   B) said transverse crossbar and horizontal plate are supported on the forwardmost end of the rearwardmost of said chassis parts.

4. A snow travel vehicle according to claim 3 wherein said horizontal plate is disposed vertically spaced above said crossbar.

5. A snow travel vehicle according to claim 1 wherein:
   A) each of said tracks includes at least two idler wheels, and
   B) an articulated cleated tread extends tautly about said drive sprocket and idler wheels in operative engagement therewith.

6. A snow travel vehicle according to claim 5 wherein:
   A) a fixed transverse horizontal crossbeam is provided on each of said chassis parts having ends extending outwardly beyond the frames thereof, B) a longitudinally extending independently suspended "walking" track beam is pivotally supported adjacent the ends of said crossbeams for limited movement relative thereto.

C) said drive sprocket and drive motor are supported with their axes perpendicular to said longitudinal beams, and D) said idler wheels are supported for rotation on stub axles supported in said horizontal beams.

7. A snow travel vehicle according to claim 6, wherein each of said tracks includes at least three in-line idler wheels, one of said idler wheels being forwardmost, one rearwardmost, and the remainder intermediate, and said drive sprocket is positioned rearwardly of the rearwardmost of said idler.

8. A snow travel vehicle according to claim 7 wherein said "walking" beams are suspended below the ends of said crossbeams for pivotal rotation on transverse horizontal axes.

9. A snow travel vehicle according to claim 1 wherein:
A) said internal combustion power system is supported on the frame of the rearwardmost of said chassis parts, and
B) an operator's cabin is supported on the frame of the forwardmost of said chassis parts.

10. A snow travel vehicle which comprises
A) a two-part in-line articulated chassis, one of said parts being a forward part and the other of said parts being a rear part, said chassis parts each including a frame, said chassis being pivoted about a vertical axis for limited side-to-side relative movement for steering and pivoted about a horizontal axis for limited movement to accommodate ground irregularities.
 1) one of said chassis parts including at transverse horizontal crossbar engaging a vertical pivot pin supported by the other of said chassis parts,
 2) a pair of generally longitudinally extending hydraulic cylinders pivotally secured at one end in the other of said chassis parts, said cylinders each including a piston having a free end extending beyond the end of the cylinder.
 3) the free ends of the pistons of said cylinders are pivotally connected to said crossbar on opposite sides of the pivot pin, and
 4) said chassis parts including a transverse horizontal plate parallel to and spaced vertically from said crossbar and pivotally connected to the other chassis part for limited movement about a horizontal axis,
B) at least one track on each opposite side of each of said chassis parts, each of said tracks being supported by a plurality of longitudinally in-line wheels, one of those wheels being a drive sprocket having a direct drive hydraulic motor connected thereto, and an articulated cleated tread extending tautly about said wheels,
C) independent beam suspension means for each of said tracks comprising:
 1) a fixed transverse horizontal crossbeam of each of said chassis parts having ends extending outwardly beyond the frames thereof,
 2) a longitudinally extending independently suspended "walking" track beam pivotally supported adjacent the ends of said crossbeams for limited movement relative thereto, said wheels and drive motor being supported thereon,
D) a hydraulic power system connected to each of said hydraulic motors and said hydraulic cylinders, and
E) an internal combustion power system mounted on one part of said chassis to energize said hydraulic power system.

11. A snow travel vehicle according to claim 10 wherein said crossbar is pivotally connected to the frame of said chassis part by a spaced apart pair of parallel tie-rods pivotally connected at their opposite ends to the crossbar and chassis frame, respectively.

12. A snow travel vehicle according to claim 10 wherein:
A) said vertical pivot pin includes a ball of a ball and socket bearing, and
B) said transverse horizontal plate includes a centrally disposed socket bearing in engagement with said ball to permit relative movement between said chassis parts in response to variations in ground level.

13. A snow travel vehicle according to claim 10 wherein:
A) said transverse crossbar and horizontal plate are supported on the forwardmost end of the rearwardmost of said chassis parts, and said plate is disposed vertically above said crossbar, and
B) said pivot pin and hydraulic cylinders are supported on the rearward end of the forwardmost of said chassis parts.

14. A snow travel vehicle according to claim 10, wherein:
A) said drive sprockets and drive motors are supported with their axes perpendicular to said track beams,
B) said idler wheels are supported for rotation on stub axles supported in said track beam, and
C) each of said tracks includes at least three in-line idlers wheels, one of said idler wheels being forwardmost, one rearwardmost, and the remainder intermediate, and said drive sprocket is positioned rearwardly of the rearwardmost of said idlers.

15. A snow travel vehicle according to claim 10 wherein said "walking" beams are suspended below the ends of said crossbeams for pivotally rotation on transverse horizontal axes.

16. A snow travel vehicle according to claim 10 wherein:
A) said internal combustion power system is supported on the frame of the rearwardmost of said chassis parts, and
B) an operator's cabin is supported on the frame of the forwardmost of said chassis parts.

* * * * *